United States Patent [19]

Shimanski et al.

[11] Patent Number: 5,215,826

[45] Date of Patent: Jun. 1, 1993

[54] SURFACING FILM WITH THERMOFORMABLE CARRIER LAYER

[75] Inventors: Michael A. Shimanski; Thomas M. Ellison, both of Charlotte, N.C.

[73] Assignee: Rexham Industries Corp., New York, N.Y.

[21] Appl. No.: 587,954

[22] Filed: Sep. 25, 1990

[51] Int. Cl.⁵ .................................... B32B 27/06
[52] U.S. Cl. ............................ 428/483; 427/154;
427/398.1; 428/31; 428/349; 428/354; 428/914
[58] Field of Search ............ 428/31, 40, 208, 483,
428/349, 195, 201, 116, 354, 914, 202;
427/398.1, 154

[56] References Cited

U.S. PATENT DOCUMENTS

| | | | |
|---|---|---|---|
| 3,640,791 | 2/1972 | Rosenheim | 156/230 |
| 3,919,379 | 11/1975 | Smarook | 428/116 |
| 3,928,710 | 12/1975 | Arnold et al. | 428/483 |
| 4,072,779 | 2/1978 | Knox et al. | 428/430 |
| 4,101,698 | 7/1978 | Dunning | 428/31 |
| 4,263,077 | 4/1981 | Rampelberg | 156/230 |
| 4,291,085 | 9/1981 | Ito et al. | 428/215 |
| 4,326,005 | 4/1982 | Reed et al. | 428/201 |
| 4,330,352 | 5/1982 | Grimes et al. | 156/235 |
| 4,392,905 | 7/1983 | Boyd et al. | 156/235 |
| 4,421,816 | 12/1983 | Arnold | 428/202 |
| 4,421,839 | 12/1983 | Takiguchi et al. | 430/164 |
| 4,451,522 | 5/1984 | de Vroom | 428/201 |
| 4,497,851 | 2/1985 | de Vroom | 427/147 |
| 4,810,540 | 3/1989 | Ellison et al. | 428/31 |
| 4,818,589 | 4/1989 | Johnson et al. | 428/201 |
| 4,824,506 | 4/1989 | Hoerner et al. | 156/245 |
| 4,931,324 | 6/1990 | Ellison et al. | 428/31 |
| 4,943,680 | 7/1990 | Ellison et al. | 427/154 |
| 4,976,896 | 12/1990 | Short et al. | 427/398.1 |
| 5,114,789 | 5/1992 | Reafler | 428/328 |

FOREIGN PATENT DOCUMENTS

| | | |
|---|---|---|
| 159942 | 10/1985 | European Pat. Off. |
| 0230364 | 7/1987 | European Pat. Off. |
| 266107 | 5/1988 | European Pat. Off. |
| 348310 | 12/1989 | European Pat. Off. |
| 53-097510 | 8/1978 | Japan |
| WO84/03473 | 9/1984 | PCT Int'l Appl. |
| WO86/01771 | 3/1986 | PCT Int'l Appl. |

OTHER PUBLICATIONS

Johnson B., "Development of an Automotive 'Paint Film' Concept," *SAE Technical Paper Series*, 890352, 1989.

*Primary Examiner*—P. C. Sluby
*Assistant Examiner*—Hoa T. Le
*Attorney, Agent, or Firm*—Bell, Seltzer, Park & Gibson

[57] ABSTRACT

The present invention provides surfacing films for the production of articles having uniform, high quality decorative features. The surfacing films have a thermoformable carrier layer that provides enhanced protection of the decorative features of the film during fabrication of the article. The carrier layer may be further utilized to impart a desired finish on the surfacing film during post-forming.

24 Claims, 2 Drawing Sheets

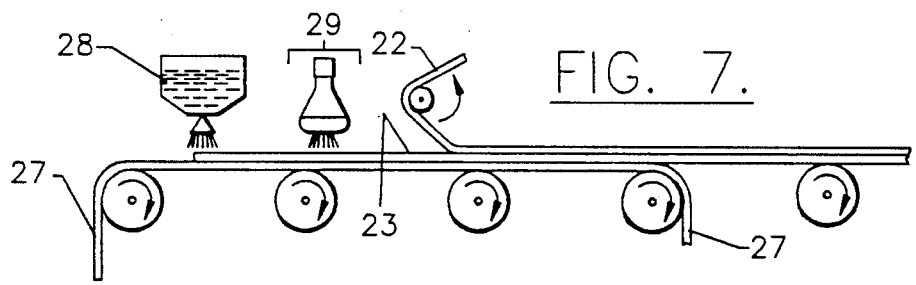
FIG. 7.
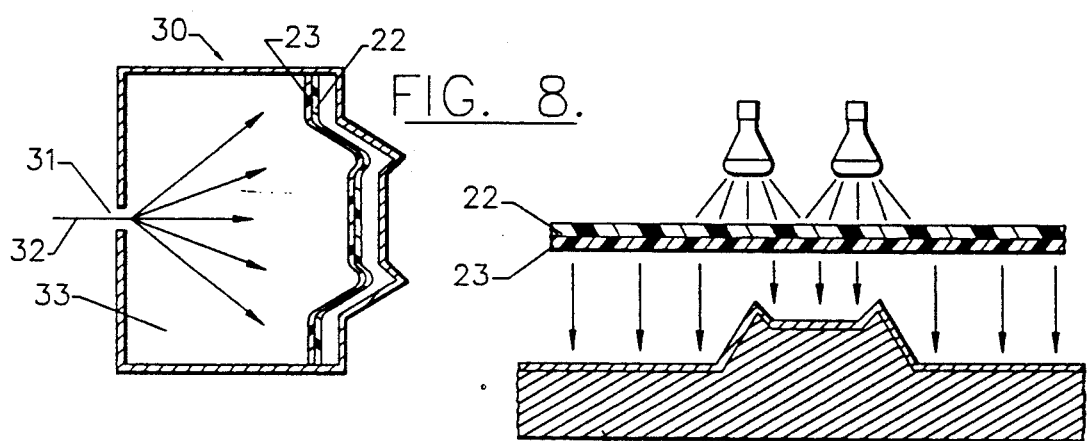
FIG. 8.
FIG. 9.
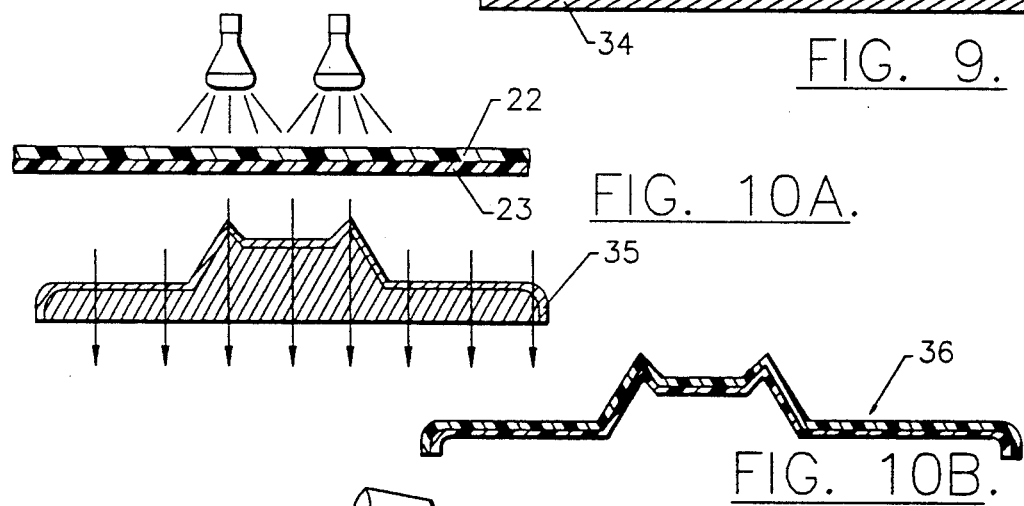
FIG. 10A.
FIG. 10B.
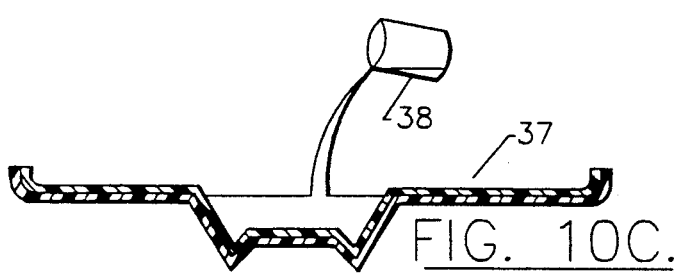
FIG. 10C.
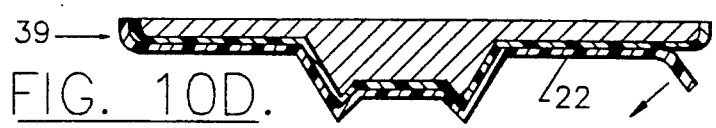
FIG. 10D.

SURFACING FILM WITH THERMOFORMABLE CARRIER LAYER

FIELD OF THE INVENTION

The present invention pertains to surfacing films that provide a decorative feature to a variety of substrates, and more specifically pertains to surfacing films which are suited for being therformed to produce highly contoured articles.

BACKGROUND OF THE INVENTION

Among the most important selling features of an automobile is the quality of its painted finish. For this reason, automobile manufacturers are particularly concerned with producing a high quality exterior finish on today's automobile.

Many of the automobile parts currently used are fabricated from lightweight materials, such as aluminum and plastics, which do not themselves possess a desirable finish, or prematurely lose that finish when exposed to the elements. Various approaches have been taken to providing a high quality automotive paint-like finish to lightweight parts, such as molded plastic parts. One approach which has received considerable attention uses a preformed paint-like film which can be either bonded to a preformed part or applied to a plastic part as it is molded.

One such surfacing film is a paint transfer article described in U.S. Pat. No. 4,818,589. See also Johnson, B., "Development of an Automotive "Paint Film" Concept," *SAE Technical Paper Series*, 890532, 1989. The paint transfer articles described in the preceding references use standard autobody paints for the coating composition to add the decorative feature to a surfacing film for automobile body parts. Properties of the cited carrier restrict its utility as a protective carrier.

Commonly-owned U.S. Pat. Nos. 4,810,540, 4,931,324 and 4,943,680 describe surfacing films which are formed from liquid cast molecularly unoriented polymer films. The molecularly unoriented polymer films produce high quality, high gloss paint-like finishes on contoured articles such as automobile body parts.

The paint-like coating compositions of the foregoing surfacing films are typically formed by spraying, casting or coating the paint-like layer onto a casting base. The casting base must have uniform texture or gloss, since this texture and gloss is transferred to the surface of the colored surfacing film layer.

The casting base is selected for its stability under a variety of conditions. In general, high tensile strength is required so that the casting base, and consequently the paint-like layer, is not distorted by application of the tension required to advance the casting base through a coating machine. After application of the paint-like coating composition, the coated casting base would be typically run through a heating chamber to remove solvents or to fuse or cure/crosslink the polymeric components of the paint-like coating and so the casting base must have low extensibility at elevated temperature.

Additionally, the solvents of the coating composition may distort or impair the finish of the casting base, and so the base must be substantially solvent resistant. Accordingly, suitable films for the purposes described in the foregoing references are films that are stiff and rigid, resist distortion at elevated temperature, and are unaffected by harsh solvents.

In many applications, the casting base will be left in place on the surfacing film after the surfacing film is manufactured so that it thus serves as a protective carrier layer during shipment and handling and during subsequent application of the film to a substrate. In such applications, the carrier layer should be sufficiently flexible and extensible to conform intimately to the contours of the substrate. Such conformation may be enhanced by the application of heat, i.e. the carrier layer can be thermoformed.

The thermoformability of these carrier layers, however, is substantially limited. This is because the physical properties (e.g., low extensibility at elevated temperature) which make a film a good casting base are the very properties which would serve to restrict thermoformability if the film is to later serve as a carrier layer. Accordingly, the carrier layers of the foregoing references necessarily have restricted thermoformability. Carrier layers with restricted thermoformability may be suitably employed in applications where the amount of stretching or drawing is limited, but they produce defects such as cracking, wrinkling, crazing, and blushing when subjected to higher degrees of drawing or stretching by thermoforming and such films do not conform to replicate the mold surface. Because of the intimate proximity of the carrier layer and the paint-like layer, those defects are transferred to the paint-like layer, adversely affecting its value as a decorative feature of an article.

SUMMARY OF THE INVENTION

The surfacing films of the present invention comprise a decorative layer formed of a liquid cast molecularly unoriented polymer releasably bonded to a carrier layer having reduced tensile strength at elevated temperature. The carrier layer is thus readily thermoformable. Such surfacing films enable the production of highly contoured articles having improved decorative features because they demonstrate a reduced tendency to develop surface imperfections when subjected to severe post-forming.

These surfacing films are formed by applying the paint-like layer onto casting bases that have low extensibility at elevated temperature. The coated casting base is then heated to fuse or cure/crosslink the polymeric components. The exposed surface of the thus-formed coating is then releasably bonded to a thermoformable carrier layer or alternatively, the casting base is removed and replaced with a formable carrier on the side replacing the casting base. The carrier layer is clear or lightly tinted to allow inspection of the paint surface prior to and after forming without disrupting the peelable bond between the carrier and the paint-like surface. These surfacing films can be severely post-formed without developing undesirable surface irregularities.

BRIEF DESCRIPTION OF THE DRAWINGS

FIG. 7 is a schematic illustration of a process used for fabricating the surfacing films of the present invention.

FIG. 8 is an illustration of the use of the surfacing film of this invention in a thermoplastic injection molding process wherein the substrate is injected into the mold where it is bonded directly onto the side of the surfacing film opposite the carrier layer simultaneously forming the article.

FIG. 9 shows the application of the surfacing film directly to a pre-formed substrate.

FIGS. 10 A-D show the process of shaping the surfacing film over a mold, removing the film from the mold, pouring a liquid substrate into the well formed in the film, and solidifying the substrate.

DETAILED DESCRIPTION OF THE INVENTION

Figure 1:
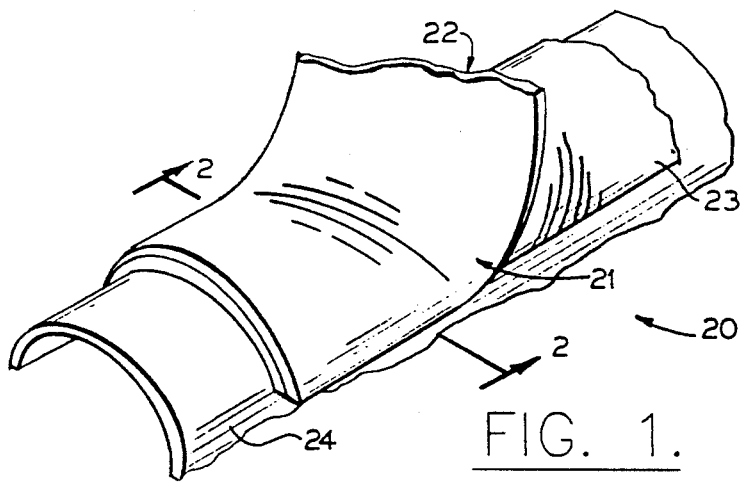
FIG. 1 is an illustration of an article such as an automobile body part, which, for the sake of contrast, shows a surfacing film applied over only a portion of the exterior surface of the article, the uppermost carrier layer is partially peeled away from the surfacing film to reveal a textured surface.

FIG. 1 shows a contoured article 20, such as an automobile body part, incorporating a surfacing film 21 in accordance with the present invention. These and other highly contoured articles are ideal applications for the surfacing films of the present invention because the films can be severely post-formed to replicate a mold or part surface without cracking, crazing, wrinkling, or blushing. The films incorporate a thermoformable carrier layer 22 that protects the underlying layers of these films through severe post-forming without adversely affecting the decorative texture or finish of the underlying layers.

FIG. 1 further shows that the carrier layer 22 is releasably bonded to the underlying decorative layers 23. The carrier layer 22 can be removed from the article 20 at any time after application of the film to the substrate and will preferably be done after post-forming. As the carrier layer is peeled away from the exterior of the surfacing film, a post-formed article having a uniformly high quality texture or finish is revealed.

Figure 2:
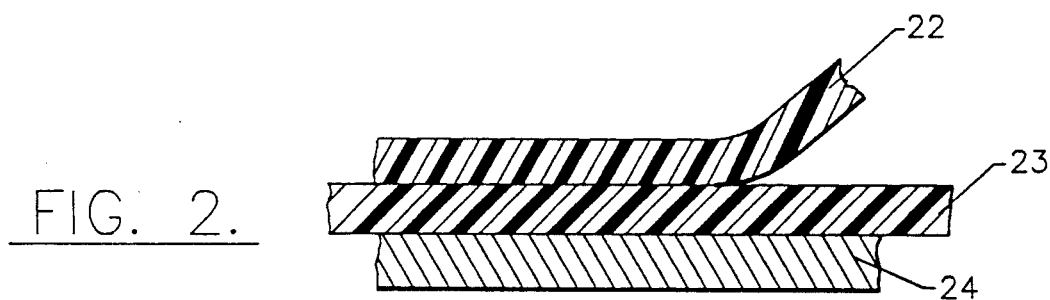
FIG. 2 is a cross-sectional view taken through line 2—2 showing the substrate, the decorative layer, and the carrier layer partially peeled away.

FIG. 2 shows a cross-sectional view of the article 20 taken along line 2—2 of FIG. 1. In this illustration the decorative layer 23 is bonded directly to the substrate 24 on the side opposite the side bonded to the carrier layer. Partially removed carrier layer 22 overlies the decorative layer and is releasably bonded thereto forming the outermost layer of the surfacing film.

Figure 3:
FIG. 3 shows a cross-sectional view of the surfacing film illustrating the decorative layer and the carrier layer.

FIG. 3 shows the surfacing film, per se, illustrating the relationship between the decorative layer 23 and the carrier layer 22. The carrier layer of the present invention is a flexible, extensible polymeric film. More specifically, the carrier layer is a thermoformable film, i.e., a film having reduced tensile strength at elevated temperature so that it will distort at elevated temperature with minimal resistance. With reduced resistance to deformation the film readily conforms to the mold or part surface and has less tendency for defects to arise such as cracking, crazing, wrinkling, or blushing.

A thermoformable film is one that is flexible and extensible having a tensile strength of less than about 0.5 pounds per linear inch (pli) at the thermoforming temperature. Thus, for the purposes of the present invention, a thermoformable carrier layer is a polymer film having a tensile strength of less than about 0.5 pli at 300° F.

Suitable thermoformable carrier layers may also be defined as those that have an elongation of greater than 50% when exposed to a load of 500 psi at 200° F. Preferred carrier layers will have an elongation under those conditions of greater than 100%.

Preferred thermoformable carrier layers include those formed from polyolefins and amorphous polyesters and their copolymers, alloys and blends. The most preferred material for the carrier layer is molecularly oriented polypropylene copolymer in a gauge range of about 0.001 to about 0.003 inches thick. Commercially available examples of oriented polypropylene copolymer are Extrel 23 ® available from Exxon; and Bicor ® BSR-1 from Mobil. In general, homopolymers and copolymers of ethylene and propylene work well as carrier layers for these surfacing films.

Other preferred carrier layers include films of molecularly unoriented (amorphous) forms of polyesters such as polyethylene terephthalate (PET), polyethylene terephthalate - ethylene glycol modified (PETG), polybutylene terephthalate, and amorphous copolymers, alloys and blends thereof. More specifically, a flat die extruded PETG in a gauge range of 0.002 to 0.010 inches is another particularly preferred material for the carrier layers of this invention. A commercially available example of an amorphous PETG is Pacur PETG from Pacur, Inc.

Additional materials useful for forming the flexible, extensible carrier layers of the present invention include polystyrene and polyvinyl chloride. The flexible, extensible carrier layers may be formed from any polymeric materials that have the desired surface properties and meet any of the preceding definitions for a thermoformable material.

FIG. 3 shows a thermoformable surfacing film comprising a decorative layer 23 formed of a liquid cast molecularly unoriented polymer, said decorative layer releasably bonded to a thermoformable carrier layer 22 formed of a polymer film having a tensile strength of no more than about 0.5 pounds per linear inch at 300° F.

The decorative layer 23 is a substantially molecularly unoriented liquid cast polymer film that is resistant to stains and the harsh effects of prolonged exposure to the weather and sun. The decorative layer may be transparent or pigmented and optionally has reflective flakes uniformly distributed therein for a metallic appearance. The decorative layer may comprise more than one of such polymer films as, for example, those decorative layers simulating the appearance of a base coat/clear coat paint finish described in U.S. Pat. Nos. 4,810,540, 4,931,324 and 4,943,680, which are hereby incorporated by reference. Examples of such liquid cast polymer films are those formed from urethane polymers, acrylate polymers, vinyl polymers, fluoropolymers and blends thereof. Particularly preferred are fluoropolymers. And a particularly preferred fluoropolymer is FLUOREX ®, an alloy of an acrylic polymer and polyvinylidene fluoride produced by Rexham Corporation.

Figure 4:
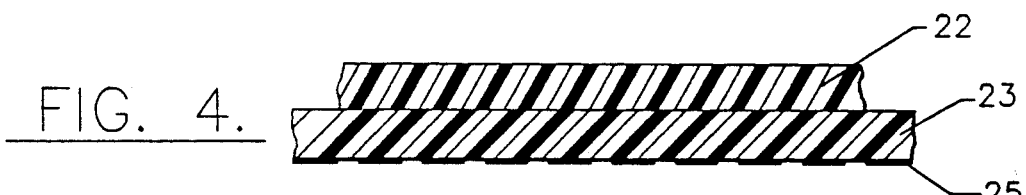
FIG. 4 shows a cross-sectional view of the surfacing film wherein the decorative layer is treated by electrical discharge (corona treatment) to yield a wetting tension of at least about 40 dynes/cm to improve adhesion of certain substrate polymers.

FIG. 4 shows an embodiment of the surfacing film shown in FIG. 3 wherein the exposed surface of the film has been subjected to a corona treatment 25 to enhance bonding between the substrate and the surfacing film. The resulting surfaces wetting tension is at least about 40 dynes/cm.

Figure 5:
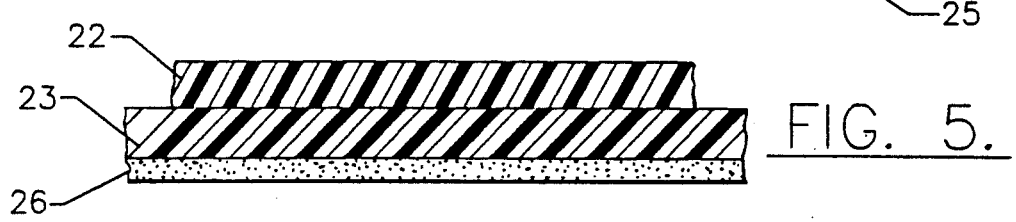
FIG. 5 shows a cross-sectional view of the surfacing film wherein a bonding layer has been applied to the underside of the decorative layer.

FIG. 5 shows another embodiment of the surfacing film of FIG. 3 wherein a bonding layer is provided on the surfacing layer to enhance bonding between the substrate and the surfacing film. The bonding layer 26 will be interposed between the substrate 24 and the major surface of the decorative layer opposite the surface bonded to the carrier layer 22. For example, the major surface of the decorative layer opposite the surface bonded to the carrier layer is coated with an adhesive, e.g. a urethane adhesive, or a heat reactive acrylic adhesive, or a pressure sensitive acrylic adhesive, by which the substrate and decorative layer are irreversibly bonded together.

Additionally, a bonding layer may be included in the articles of the present invention by the use of a laminated film or sheet layer. In such embodiments the laminated film or sheet layer comprises a material that is thermoformable and forms the bond between the substrate and the surfacing layer. Examples of materials suitable for use in such a bonding laminate layer include: polypropylene such as Extrel ® 23 from Exxon; copolymers and polymer blends of polypropylene; polyethylene terephthalate - ethylene glycol modified such as Pacur PETG ™ 6763 from Pacur, Inc.; acrylonitrile-butadiene-styrene resins (ABS) such as Cycolac ® available from G.E.; polycarbonates such as Lexan ® available from G.E.; copolymers and polymer blends of polycarbonate; copolymers and polymer blends of polyesters; amorphous polyethylene terephthalate such as Pacur A-150 from Pacur, Inc.; and polyvinyl chloride (PVC) such as Geon ® available from General Tire.

Figure 6:
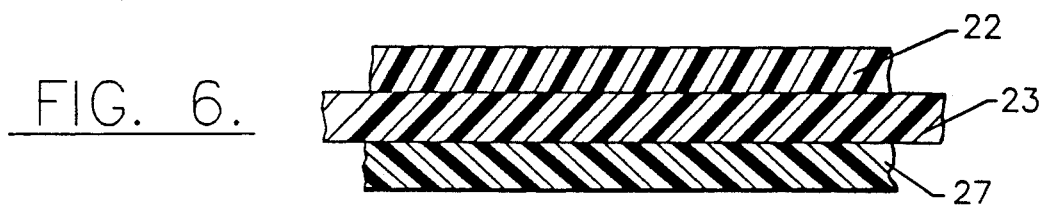
FIG. 6 shows a cross-sectional view of the surfacing film including the casting base, decorative layer, and carrier layer.

FIG. 6 shows the surfacing film before removal of the casting base 27. The casting base is formed of sturdy material that is resistant to heat and solvents. It must be a relatively inflexible and inextensible material. It must have high tensile strength to ensure that the liquid cast decorative layer is not deformed or damaged during processing. In general, a minimum tensile strength of about 0.5 pounds per linear inch is required for the casting bases of the present invention.

Alternatively, suitable casting bases can be identified by their maximum load at 5% elongation in pounds/inch width at 250° F. Suitable casting bases will have a maximum load at 5% elongation of about 3 pounds/inch width or more.

Suitable casting bases can also be identified as those that have less than 10% elongation when exposed to a load of 500 psi at 200° F.

The casting base must also be solvent resistant so that the structural integrity is not degraded when the solvents contained in the casting solution are applied.

Accordingly, casting bases having tensile strength of at least about 0.5 pli at 300° F. are suitable casting bases for purposes of this invention. Materials that can be used to fabricate casting bases having those properties are molecularly oriented, heat set polyesters. A preferred example of such a casting base is that formed from a film of biaxially oriented and heat set polyethylene terephthalate. Commercially available examples of those materials are Hostophan ®, available from Hoechst Celanese; Mylar ®, available from DuPont; Melanex ® available from ICI; and Scotchpar ®, available from 3M. Films of these materials have the desired tensile strength at 300° F. at thicknesses of about 90 to about 300 gauge thickness.

Other commonly used casting bases such as casting paper, optionally having a release coating, are also suitable for purposes of the present invention.

FIG. 7 schematically illustrates the process of fabricating the surfacing films described herein. The film that forms the decorative layer is first cast as a liquid 28 onto a suitable casting base 27.

The casting base/liquid cast film are advanced through a heated zone 29 to remove solvent and to fuse the thermoplastic constituents, or cure/crosslink reactive compositions. To fuse or cure/crosslink the decorative layers of the present invention, the heated zone must exceed about 200° F. Polyvinylidene fluoride films, e.g., FLUOREX ®, require temperatures in excess of about 350° F. to fuse the thermoplastic composition. Accordingly, a suitable casting base must be nonthermoformable, i.e., retain high tensile strength at elevated temperature, so that it does not distort and compromise the structural continuity of the decorative film.

The surfacing films of the present invention are applied to a variety of substrates, e.g., metals and polymers, and are especially useful where the surfacing film or the finished article is subjected to severe post-forming.

In one method, schematically illustrated in FIG. 8, the surfacing film is placed in an injection molding form 30 such that the carrier layer faces away from injection ports 31, the liquid polymeric substrate 32 is injected through the ports into the mold cavity 33 whereupon the injected liquid substrate material forces the surfacing film to replicate the mold cavity and the surfacing film and substrate are bonded together and simultaneously formed.

FIG. 9 illustrates a process whereby the finished article is fabricated by post-forming the surfacing film directly onto a formed substrate 34 by a combination of heat and vacuum.

Still another common method is schematically illustrated in FIG. 10. It involves post-forming the surfacing film to a mold 35, removing the film 36 from the mold, and filling the void 37 left in the film with a liquid polymeric substrate 38, which solidifies to form the finished article 39. The carrier layer 22 is removed as desired.

It is further contemplated that the surfacing films of the present invention enable the fabrication of highly contoured articles by profile extrusion processes.

The present invention further provides methods for fabricating surfacing films and articles incorporating said surfacing films. A method for fabricating surfacing films in accordance with the present invention comprises liquid casting a decorative layer formed of a molecularly unoriented fluoropolymer film onto a suitable casting base formed of a film having a tensile strength of at least about 0.5 pounds per linear inch at 300° F. and releasably bonding a thermoformable carrier layer formed of a polymer film having a tensile strength of less than about 0.5 pounds per linear inch at 300° F. to a major surface of the cast fluoropolymer layer opposite the surface bonded to the casting base.

Additionally, the present invention provides methods for fabricating articles having a decorative and weather resistant surface comprising: casting a decorative layer formed of a molecularly unoriented fluoropolymer onto a suitable casting base having a tensile strength of at least about 0.5 pounds per linear inch at 300° F.; releasably bonding a thermoformable carrier layer formed of a polymer film having a tensile strength of less than about 0.5 pounds per linear inch at 300° F. to an opposing surface of the decorative layer; removing the casting base; irreversibly bonding the surface of the decorative layer opposite the surface bonded to the carrier layer to a substrate; and post-forming the article.

Thus, the present invention provides a method for fabricating a surfacing film comprising casting a liquid cast decorative layer formed of a molecularly unoriented fluoropolymer film onto a casting base formed of a film of a biaxially oriented and heat set polyester and transferring the decorative layer to a flexible, extensible carrier layer formed of a thermoformable polymer film.

Accordingly, a preferred embodiment of the present invention is that wherein the casting base 27 is removed from the surfacing film before the substrate is bonded thereto to form the finished article.

Thus, the present invention provides articles having a decorative surface appearance, such articles comprising a substrate 24, a decorative layer 23 formed of a molecularly unoriented fluoropolymer film, and a thermoformable carrier layer 22 formed of a polymer film having a tensile strength of less than about 0.5 pounds per linear inch at 300° F. wherein said carrier layer is releasably bonded to said decorative layer, and said decorative layer is irreversibly bonded to said substrate.

The articles of the present invention optionally further comprise an intermediate bonding layer 26 interposed between said decorative layer 21 and said substrate 23.

Furthermore, the articles of the present invention further comprise a laminated substrate such that the laminate layer forming the surface of the substrate that is bonded to the surfacing film, per se, is fabricated from a material that forms an especially strong, irreversible bond with the surfacing film.

These and other embodiments of the present invention are the subjects of the following examples and claims.

EXAMPLE I

Casting Base v. Thermoformable Carrier

The sample film strips described below were cut to a width of 0.5 inches and sufficient weight was attached to one end to produce a force of 500 PSI. The samples were suspended in a quick recovery air circulating oven set at 225° F. The oven temperature dropped to about 200° F. when the door was opened for introduction of the sample. The samples were exposed to the heat for one (1) minute during which time the temperature increased to approximately 223° F.

The oriented polypropylene and the amorphous PETG showed very substantial extensibility at elevated temperature. Films fabricated from these materials are preferred carrier layers.

In contrast, the biaxially oriented and heat set PET (Hostaphan ®) showed minimal extensibility at elevated temperature. Films formed from these materials are not thermoformable and therefore are not suitable as carrier layers. Instead, films formed from these materials are preferably used as casting bases.

TABLE I

| Sample Description | APP. WT. (lb.) | Init. Gauge Length (") | Final Gauge Length (") | Change (%) |
|---|---|---|---|---|
| Hoechst Celanese - Hostaphan 4300 biaxially oriented and heat set polyethylene terephthalate (PET) - 0.002 inches thick - high gloss | 0.5 | 1.25 | 1.29 | 4 |
| Exxon - Extrel 23 oriented polypropylene copolymer - 0.003 inches thick - matte gloss | 0.75 | 1.25 | >4.6 | >268 |
| Pacur - Pacur PETG ™ flat die extruder amorphous polyethylene terephthalate - ethylene glycol modified (PETG) - 0.008 inches thick - high gloss | 2.0 | 1.25 | >4.4 | >252 |

EXAMPLE II

Thermoformability

The following samples were analyzed as candidates for carrier layer film materials:
  A. DuPont—Mylar ® A 0.001" biaxially oriented and heat set Polyethylene Terephthalate (PET).
  B. Mobil—Bicor ™ BSR-1 0.001" oriented Polypropylene copolymer (PP).
  C. Pacur—Pacur PETG ™ 0 020" flat die extruded amorphous polyethylene terephthalate-ethylene glycol modified (PETG).

These samples were hot nipped to a film of an acrylic polymer and polyvinylidene fluoride polymer alloy (Fluorex ® A) to form a peelable bond. The laminated samples were placed in a vacuum former (Zed Industries Vacuum Former Model L-2) with the carrier layer side up and the samples were exposed to the following cycle:

| Heat Set Temp | 575° F. |
|---|---|
| Heat Time | 10 sec. |
| Form Time | 9 sec. |
| Cool Time | 15 sec. |

An oval shaped aluminum mold was used for forming. The dimensions of the mold were 4½"×9-15/16" at the base by 1⅞" high. The mold had a flat top measuring 3½"3×8-15/16".

The Mylar ® (biaxially oriented and heat set pET) carrier layer sample did not form. The sheet distorted slightly but remained essentially a flat sheet. Accordingly, these nonthermoformable samples are not suitable for purposes of the present invention for use as carrier layers.

In contrast, the Pacur PETG ™ and Bicor ® (oriented polypropylene) samples formed readily to replicate the mold surface. These are preferred examples of suitable materials for the carrier layers of the present invention.

What is claimed is:

1. A thermoformable surfacing film comprising a decorative layer formed of a cast molecularly unoriented polymer film releasably laminated to a thermoformable carrier layer formed of a flexible, extensible polymer film having a tensile strength of no more than about 0.5 pounds per linear inch at 300° F.

2. The surfacing film of claim 1 wherein the carrier layer comprises a film formed of an amorphous polyester.

3. The surfacing film of claim 2 wherein the carrier layer is formed from a flat die extruded film of amorphous polyethylene terephthalate - ethylene glycol modified having a thickness of about 0.002 to about 0.010 inches.

4. The surfacing film of claim 2 wherein the carrier layer comprises a film of amorphous polyethylene terephthalate.

5. The surfacing film of claim 1 wherein the carrier layer comprises a film of amorphous polybutylene terephthalate.

6. The surfacing film of claim 1 wherein the carrier layer comprises a film formed from a polyolefin or copolymers or polymer blends thereof.

7. The surfacing film of claim 6 wherein the carrier layer comprises a molecularly oriented polypropylene copolymer film having a thickness of about 0.001 to about 0.003 inches.

8. The surfacing film of claim 1 wherein the surface of the decorative layer opposite the surface bonded to said carrier layer has a wetting tension of at least about 40 dynes/cm.

9. The surfacing film of claim 1 further comprising a bonding layer applied to a major surface of the decorative layer opposite the surface bonded to said carrier layer.

10. The surfacing film of claim 1 wherein the decorative layer comprises a liquid cast, molecularly unoriented fluoropolymer.

11. A thermoformable surfacing film comprising a decorative layer formed from a molecularly unoriented cast polymer film releasably laminated to a thermoformable carrier layer formed from a flexible, extensible polymer film having a tensile strength of no more than about 0.5 pounds per linear inch at 300° F. and an elongation of greater than 50% when exposed to a load of 500 psi at 200° F.

12. The surfacing film of claim 11 wherein the carrier layer has an elongation of at least 100% when exposed to a load of 500 psi at 200° F.

13. A thermoformable surfacing film comprising a nonthermoformable casting base formed of a polymer film having a tensile strength of at least about 0.5 pounds per linear inch at 300° F., said casting base being releasably bonded to a decorative layer formed of a cast molecularly unoriented polymer, said decorative layer being releasably laminated to a thermoformable carrier layer formed of a flexible, extensible polymer film having a tensile strength of less than about 0.5 pounds per linear inch at 300° F.

14. A thermoformable surfacing film comprising a nonthermoformable casting base formed of a molecularly oriented polyester film having a tensile strength of at least about 0.5 pounds per linear inch at 300° F., said casting base being releasably bonded to a decorative layer formed of a cast molecularly unoriented fluoropolymer, said decorative layer being releasably laminated to a thermoformable carrier layer formed of an amorphous polyester film having a tensile strength of less than about 0.5 pounds per linear inch at 300° F.

15. A thermoformable surfacing film comprising a nonthermoformable casting base formed of a biaxially oriented and heat set polyester film having a tensile strength of at least about 0.5 pounds per linear inch at 300° F., said casting base being releasably bonded to a decorative layer formed of a cast molecularly unoriented fluoropolymer, said decorative layer being releasably laminated to a thermoformable carrier layer formed of a molecularly oriented polyolefin film having a tensile strength of less than about 0.5 pounds per linear inch at 300° F.

16. A thermoformable surfacing film comprising a casting base formed of a molecularly oriented polyester film; a decorative layer formed of a cast molecularly unoriented fluoropolymer having one surface thereof releasably bonded to said casting base; and a thermoformable carrier layer formed of an amorphous polyester having a tensile strength of no more than about 0.5 pounds per linear inch at 300° F. releasably laminated to the opposite surface of said decorative layer.

17. An article comprising:
a substrate;
a decorative layer formed of a cast molecularly unoriented fluoropolymer; and
a thermoformable carrier layer formed of a polymer film having a tensile strength of less than about 0.5 pounds per linear inch at 300° F.,
wherein said carrier layer is releasably laminated to said decorative layer, and said decorative layer is irreversibly bonded to said substrate.

18. An article of claim 17 further comprising an intermediate bonding layer interposed between said substrate and said decorative layer.

19. An article of claim 18 wherein the intermediate bonding layer is selected from the group consisting of heat reactive acrylic adhesives, pressure sensitive acrylic adhesives, and urethane adhesives.

20. An article of claim 18 wherein the intermediate bonding layer is a laminated film selected from the group consisting of polyesters, copolymers of polyesters, polyolefins, copolymers of polyolefins, ABS resins, PVC, polycarbonates, and polycarbonate copolymers.

21. An article comprising:
a substrate;
a decorative layer formed of a molecularly unoriented fluoropolymer; and
a thermoformable carrier layer formed of a polymer film, having a tensile strength of no more than about 0.5 pounds per linear inch at 300° F., selected from the group consisting of a molecularly unoriented polyester film and a molecularly oriented polyolefin copolymer film with a gauge range of 0.001 to 0.003 inches;
wherein said carrier layer is releasably laminated to said decorative layer and said decorative layer is irreversibly bonded to said substrate.

22. An article of claim 21 further comprising an intermediate bonding layer interposed between said substrate and said decorative layer.

23. An article of claim 21 wherein the intermediate bonding layer is selected from the group consisting of heat reactive acrylic adhesives, pressure sensitive acrylic adhesives, and urethane adhesives.

24. An article of claim 21 wherein the intermediate bonding layer is a laminated film selected from the group consisting of polyesters, polyolefins, ABS resins, PVC, polycarbonates.

* * * * *